United States Patent [19]

Kolin

[11] 3,722,505
[45] Mar. 27, 1973

[54] ORIENTABLE ELECTROMAGNETIC CATHETER PROBE AND METHOD

[75] Inventor: Alexander Kolin, Bel Air, Calif.

[73] Assignee: The Regents of the University of California, Berkeley, Calif.

[22] Filed: July 2, 1970

[21] Appl. No.: 52,032

[52] U.S. Cl..........................128/2.05 F, 73/194 EM
[51] Int. Cl. ................................................A61b 5/02
[58] Field of Search........128/2.05 F, 2.05 R, 2.05 V, 128/2.05 D, 2 E, 2 M, 214; 73/194 EM

[56] References Cited

UNITED STATES PATENTS

| | | | |
|---|---|---|---|
| 3,545,428 | 12/1970 | Webster | 128/2.05 F |
| 3,359,974 | 12/1967 | Khalil | 128/2.05 F |
| 3,516,399 | 6/1970 | Barefoot | 128/2.05 F |
| 3,347,224 | 10/1967 | Adams | 128/2.05 F |
| 3,529,591 | 9/1970 | Schuette | 128/2.05 F |
| 3,530,849 | 9/1970 | Watanabe | 128/2 E |

OTHER PUBLICATIONS

Chedd, G., New Scientist, July 13, 1967, pp. 72–74.
Kolin, A., Physiology, Vol. 57, 1967, pp. 1331–1337.

Primary Examiner—Kyle L. Howell
Attorney—Jessup & Beecher

[57] ABSTRACT

An orientable electromagnetic catheter type flow meter and method are provided, which flow meter may be introduced, for example, into a blood vessel to measure the blood flow in the blood vessel, and which is constructed to have a minimal diameter so that it may be introduced percutaneously, for example, into a branch of a larger blood vessel with minimum damage. One embodiment of the flow meter of the invention to be described includes a thin resilient probe having an angulated end portion so as to place its pick-up electrodes adjacent the inner surface of the wall of the blood vessel diagonally or diametrically across the blood vessel from one another. The aforesaid flow meter in one embodiment is constructed so that its probe may be easily turned while in the blood vessel to different orientations with respect to an external magnetic field, in order first to establish a proper base line, and then to establish optimal orientation for flow sensing. In another embodiment the external field is turned, and in yet another embodiment the animal or human subject is turned together with the flow probe relative to the external magnetic field.

11 Claims, 11 Drawing Figures

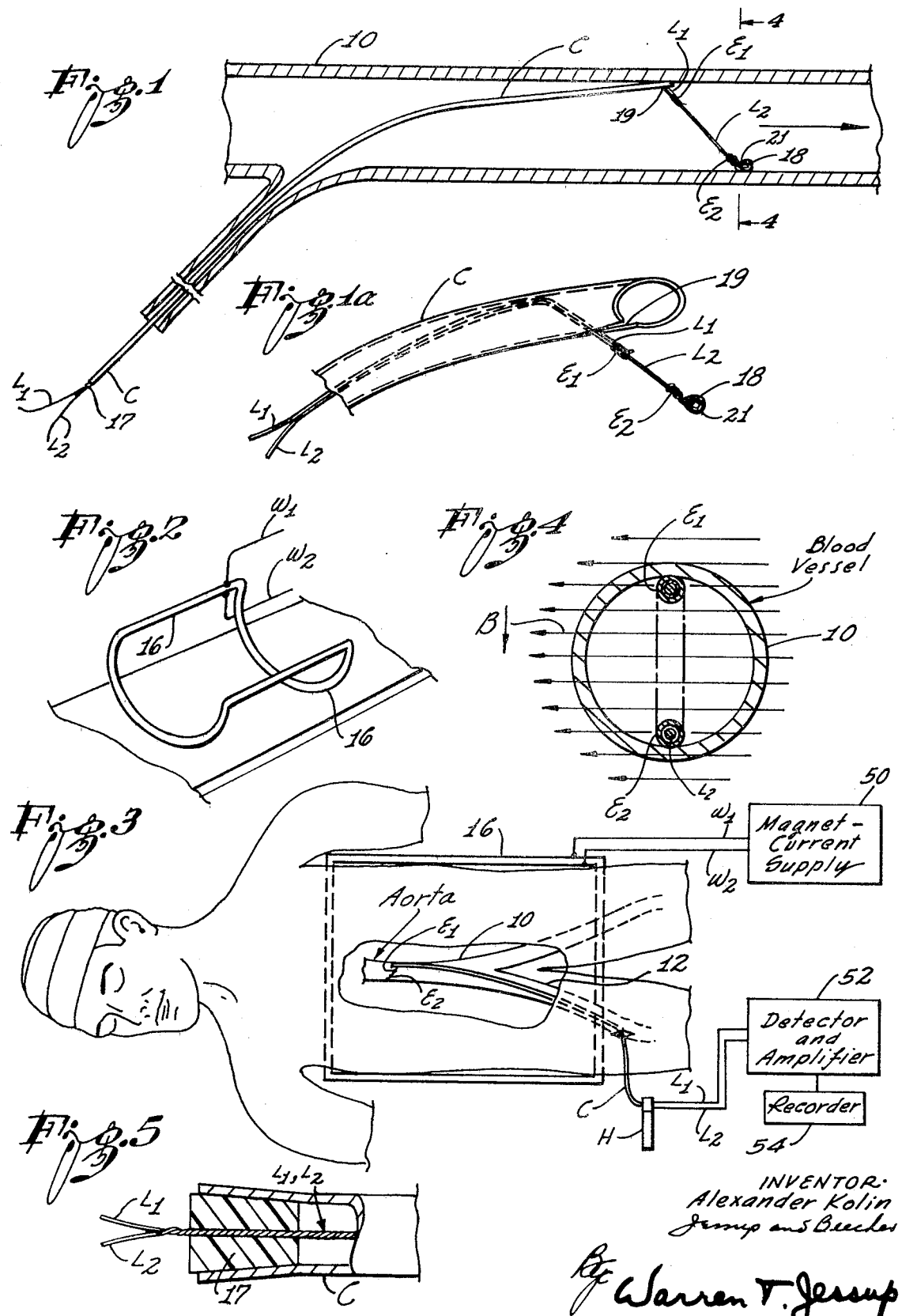

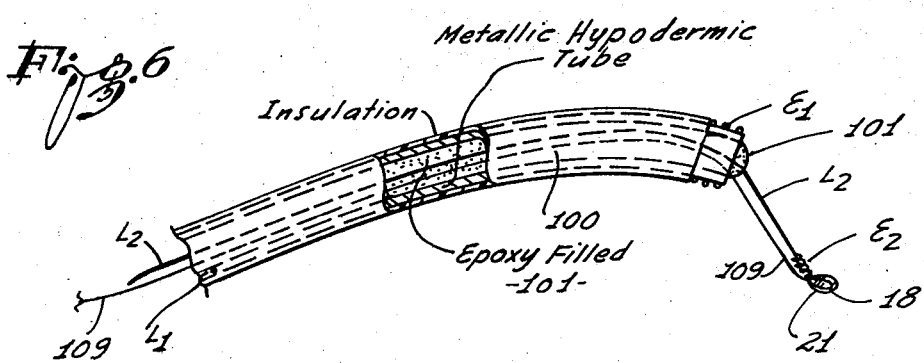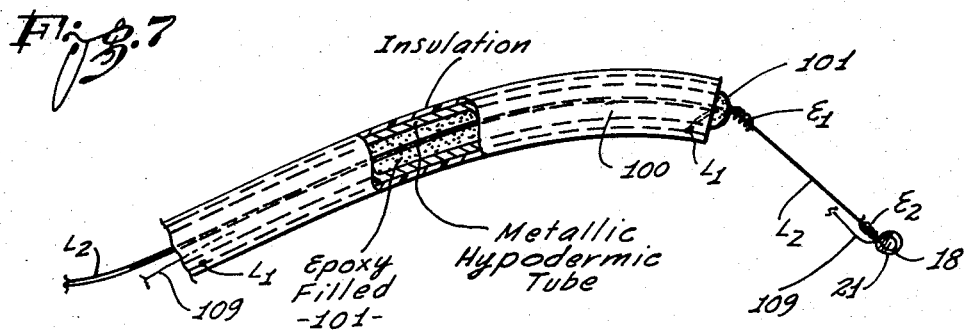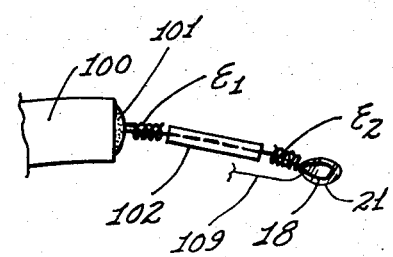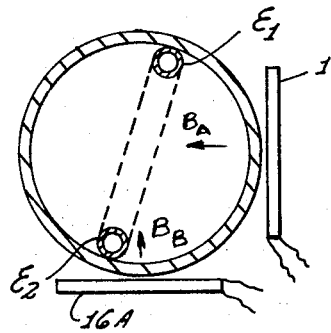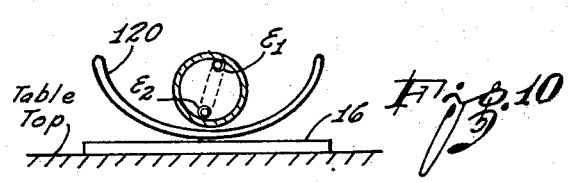

ORIENTABLE ELECTROMAGNETIC CATHETER PROBE AND METHOD

BACKGROUND OF THE INVENTION

This application is concerned with an external field electromagnetic catheter type flow meter of the same general type as described, for example, in copending application Ser. No. 32,671 entitled "Simplified External Field Electromagnetic Catheter Flow Meter" filed Apr. 28, 1970 in the name of Alexander Kolin.

Electromagnetic flow meters include means for producing a magnetic field across the path of a moving fluid, so that a voltage may be generated as the fluid moves through the field. This voltage is directly proportional to the average velocity of the fluid. Electromagnetic flow meters are provided with a pair of pick-up electrodes disposed across a moving fluid stream and which are held in contact with the moving fluid, so that the voltage induced in the fluid may be measured, and the resulting voltage may be utilized to determine the velocity of the fluid.

The catheter type flow meter described in the aforesaid copending application includes a probe which may be straightened to a substantially linear configuration of minimal diameter, so that it may expeditiously be inserted into the blood vessel. The said probe is resilient, so that once it is inserted into the blood vessel, it may assume an S-shape or L-shape, or angular configuration, as described in the said copending application, and so that it may perform its flow meter function. The process of the present invention is also applicable to the loop-type of flow probe described in copending application Ser. No. 236,815 filed Mar. 22, 1972 in the name of Alexander Kolin.

Catheter type flow meters have been developed which comprise an electromagnetic flow transducer incorporated into a thin catheter-type tube, and which may be inserted into a branch blood vessel, such as the femoral artery or femoral vein, from which it may be maneuvered into a major artery, such as the aorta, or pulmonary artery; or vein, such as the vena cava. Such a flow meter is described, for example, by C. J. Mills, Phys. Med. Vol. 11, 323 (1966); and by Alexander Kolin et al, in the Proceedings National Academy of Sciences, 59, 808 (1968).

The electromagnetic flow meters described in the aforesaid copending applications include probes having the aforesaid resilient characteristics, and the probes are configured to assume the aforesaid S-shape, or loop-shape, or L-shape when in the blood vessel. The probes of the copending applications may be inserted percutaneously into the blood vessel by first straightening the probes into a linear configuration and by passing it through a tubular catheter into the blood vessel. The tubular catheter may be inserted into the blood vessel through a hollow needle in accordance with usual prior art practices. The probes described in the copending applications, therefore, may be introduced with a linear configuration into the blood vessel of the patient percutaneously, for example, through the tubular catheter, and the probes assume their angulated shape or loop shape after they emerge into the blood vessel under examination from the inner end of the catheter. The probes thus position their pick-up electrodes to the opposite sides of the blood stream within the blood vessel. While it is understood that the present invention can be used with either loop or L-type probes, and other similar configurations, the following description will be confined for simplicity to L-type probes serving as an illustration.

The preferred insertion technique is to introduce the resilient probe through the hollow catheter tube which, in turn, is passed through a hollow needle, the latter being used to puncture the skin and muscle. The hollow catheter tube terminates in the blood vessel at the point where the emerging probe is to measure the fluid flow. Then, as the probe emerges from the inner end of the tubular catheter within the blood vessel, its resilient characteristics cause it to angulate and to assume the desired configuration for proper flow meter operation. A sliding plug may be provided on the probe, and this plug is inserted into the external end of the tubular catheter and thereby prevents bleeding through the tubular catheter while the probe is being inserted into the blood vessel and during the flow measurement.

When the probe emerges from the inner end of the hollow catheter in the apparatus of the copending application Ser. No. 32,671, and as mentioned above, its resilient characteristics cause its pick-up electrodes to be displaced diagonally or diametrically across the blood vessel so as to perform their flow meter functions. A magnetic field is established within the blood vessel from an external means, such as an electric current carrying coil. Problems have been encountered with the aforesaid type of flow meter, in that it is necessary for the probe to be properly oriented within the blood vessel with respect to the lines of force of the magnetic field.

Specially, in order for proper measurements to be made, the probe is first oriented in accordance with the teaching of the present invention so that the plane defined by the stem of the probe and the end portion thereof which contains the electrodes is initially parallel to the lines of magnetic force developed by the external magnetic means. In such a position, the flow meter generates zero signal due to the fluid flow within the blood vessel, but the meter may develop a flow independent voltage related to eddy currents. This initial orientation permits a phase sensitive detector and compensator means to be adjusted so as to reduce extraneous current effects to zero, and thus establish the zero base line for the recording instrument. The aforesaid parallel orientation of the probe and electrode plane is evidenced when the pulsations in the output signal, corresponding to the pulsating blood flow in the blood vessel, are reduced to a minimum (ideally to zero).

After the zero base line has been established, the probe is then oriented in the practice of the invention so that the stem of the probe and the line joining the electrodes are preferably oriented to maximize their projection on the plane which is perpendicular to the direction of flow of the fluid. This is the condition for maximum sensitivity. This latter angular position is observable when the aforesaid recorded flow pulsations are maximized in the output of the instrument.

The aforesaid procedures may be carried out by turning the probe after it has been inserted into the blood vessel. It has been found that attempts to turn the aforesaid probe within the tubular catheter in which it is inserted into the blood vessel, especially when the catheter is bent or curved, creates a "snap-action" of the angulated internal end portion of the probe, so that difficulties have been encountered when it is attempted to turn the probe smoothly to a desired angular position with respect to the magnetic field. That is, it has been found that when the external protruding part of the probe is turned about its axis, there is no corresponding turning of the inner angulated part of the probe, until sufficient torque energy is built up internally due to the resilient characteristics of the probe, at which time the energy is released suddenly and actually snaps the inner angulated end portion of the probe through a large angle into an equilibrium position. This makes its very difficult to set the electrode plane to desired orientations, either parallel or perpendicular to the magnetic field.

The aforesaid difficulties are over come in the assembly of one embodiment of the present invention by providing a simple means for physically coupling the resilient probe to the tubular catheter, and by turning the catheter and the probe together. When that is accomplished, it has been found that as the probe and tubular catheter are turned about their common longitudinal axis, for example, the inner angulated end of the probe turns smoothly, so that it can be set to any desired angular position, without the aforesaid snap-action.

In another embodiment to be described, the relative orientations between the probe and the magnetic field are achieved by actually turning the magnetic field, either by physically turning the external magnetic field producing means, or by achieving the result electrically. In another embodiment, the patient together with the flow probe is turned to achieve the aforesaid relative orientations.

BRIEF DESCRIPTION OF THE DRAWINGS

FIG. 1 is a somewhat schematic representation of an electromagnetic flow meter constructed in accordance with the concepts of the present invention, and illustrated as being inserted into a blood vessel through a smaller branch blood vessel;

FIG. 1a is an enlarged fragmentary representation of the flow meter of FIG. 1, and showing particularly a particular coupling relationship between the inner resilient probe and the hollow tubular catheter through which the probe is inserted into the blood vessel;

FIG. 2 is a perspective representation of one embodiment of an external coil which may be used to establish a magnetic field within the blood vessel;

FIG. 3 is a schematic representation of the flow meter of the present invention as inserted into a patient, and showing the external coil of FIG. 2 positioned around the patient (although the coil may be flat and parallel to the plane of the table, and placed under, over or beside the patient), and also showing in block form certain electrical components which may be associated with the flow meter;

FIG. 4 is a cross-sectional view of the blood vessel and flow meter of FIG. 1 on an enlarged scale, and showing the magnetic field which is established by the external coil and which traverses the blood vessel;

FIG. 5 is a side sectional fragmentary view, on an enlarged scale, of a portion of the flow meter of FIG. 1, and showing a plug which is slidable on the stem of the aforesaid probe and which may be inserted into the end of the tubular catheter to prevent bleeding through the tubular catheter during the insertion and use of the flow probe;

FIGS. 6 and 7 are fragmentary representations of a modified construction for the flow meter;

FIG. 8 is a modified construction for the probe;

FIG. 9 is a view like FIG. 4 and illustrating a further embodiment of the invention; and FIG. 10 is a schematic representation of yet another embodiment.

DETAILED DESCRIPTION OF THE ILLUSTRATED EMBODIMENT

In the representation of FIG. 1, the electromagnetic flow meter of the invention is illustrated as inserted into a conduit, such as a blood vessel 10, for example, through a branch blood vessel 12. The flow meter includes a pair of electric leads or wires $L_1$ and $L_2$ which are connected to a pair of electrodes $E_1$ and $E_2$. The leads $L_1$ and $L_2$ may be resilient steel wires, for example, insulated by Teflon or other suitable insulating material. The electrodes $E_1$ and $E_2$, as described in the aforesaid copending application Ser. No. 32,671, may have any suitable form.

For example, the electrodes $E_1$ and $E_2$ may be the ends of the wires $L_1$ and $L_2$, formed into appropriate coils; or they may be metallic strips, or formed of metallic paste, or any other desired configuration. The preferred construction utilizes insulated (preferably Teflon) wires of steel, or other resilient metal, which are either twisted or coaxial to provide a stiff resilient noninductive stem for the probe. One of the wires $L_1$ is broken off and insulated near electrode $E_1$ while the other wire $L_2$ continues somewhat beyond electrode $E_2$.

The aforesaid resilient probe, as described in the copending application Ser. No. 32,671, may be formed by the leads $L_1$ and $L_2$ themselves. These leads, for example, may be Teflon insulated resilient steel wires twisted and bonded together; or they may be insulated flexible wires, twisted around a resilient steel stem or spine. The lead $L_1$ is made somewhat shorter than the lead $L_2$, and the insulation is removed from its right-hand end, and that end is coated with a conductive metal paste which hardens to form an electrode $E_1$. Alternately, a fine wire, preferably platinum, may be soldered or otherwise conductively fastened to the base end of the lead $L_1$ and coiled around the stem to form the electrode $E_1$, as shown in FIGS. 1 and 1a. The electrode $E_1$ is insulated from the lead $L_2$ by virtue of the insulation on the latter lead. The bare end of the lead $L_2$ may also be coated with a conductive metal paste to from the electrode $E_2$; or it may be soldered or otherwise conductively connected to a thin wire, for instance platinum, which is coiled around the end of $L_2$, as also shown in FIGS. 1 and 1a, to form the electrode $E_2$. The loose ends of the wires forming the electrodes $E_1$ and $E_2$ are fastened to the stem by epoxy or another suitable cement.

Protection against scratching of the inner wall of the blood vessel 10 as the probe is manipulated within the blood vessel is provided, for example, by forming a loop 18 at the end of the probe. A bead 21 of silicone rubber, epoxy or other material which hardens into a smooth non-liquid drop from a liquid state, may be placed within and around the loop 18 to envelop the loop and to create a smooth dull end which will not injure the artery wall when rotated or otherwise moved against it.

The leads $L_1$ and $L_2$ are preformed so that when they are inserted into the blood vessel, and when their ends emerge from the hollow catheter C, they assume the angulated configuration shown in FIGS. 1 and 1a. Moreover, the leads may be straightened to a linear configuration as they are inserted into the hollow catheter C. As mentioned above, the leads $L_1$ and $L_2$ may be twisted or parallel to one another. As an alternative, the leads may be contained in a hollow resilient sheath, which then forms the resilient stem of the probe. As another alternative, the leads themselves may be soft and flexible, and a third thin resilient wire may extend longitudinally between them or next to them and be bonded to them so as to form the desired resilient stem of the probe.

A magnetic field may be created in the blood vessel 10 in a space encompassing the electrodes $E_1$ and $E_2$ by means, for example, of an electric current carrying external coil 16, such as shown in FIG. 2. The external coil 16 may have any appropriate configuration to create the desired magnetic field in the blood vessel 10, and it may be positioned, for example, around, under or over the patient. The external coil 16 may be flat and lie directly on the surface supporting the patient, or it may be shaped, for example, as described in the copending application Ser. No. 873,240, as a cradle.

The latter configuration of the coil is shown in FIG. 2. For that configuration, the patient lies directly within the coil as shown in FIG. 3. Smaller coils may be made, and they also may have a cradle-like configuration, so that the arm or leg of the patient may be placed into the coil, when measurements are to be made on blood vessels within the arm or leg. The coil 16 may also be a flat annular coil or have any other suitable configuration, and as mentioned above, the patient may be above, beside or below the coil. Alternately, two or more coils may be used, and the patient may be sandwiched between them, or any other means for establishing a magnetic field within the blood vessel 10 may be used.

The coil 16 may have any desired number of turns, so as to produce the desired magnetic field across the blood vessel 10, as shown in FIG. 4. In FIG. 4, the blood vessel 10 is shown on an enlarged scale as a transverse section. An alternating current is introduced into the coil 16, and the coil thereby generates an alternating magnetic field having a component in the illustrated direction in FIG. 4, symbolized by the vector B across the blood vessel 10, so that the fluid flowing through the blood vessel flows transversely through the magnetic field and develops an alternating current voltage which is picked up by the electrodes $E_1$ and $E_2$. The electrodes $E_1$ and $E_2$ are preferably platinized platinum, or otherwise treated, so as to exhibit non-polarizing characteristics so as to eliminate polarization of the electrodes which adversely affects the proper electrical operation of the instrument.

As mentioned above, the electrodes $E_1$ and $E_2$, in the position shown in FIG. 4, are in position to generate maximum electrical signals corresponding to the blood flow through the vessel. However, as an initial adjustment, and in order to establish the zero base line, the electrodes must first be turned so that they lie in a plane parallel to the magnetic lines of force, that is, they must be turned through 90° with respect to the representation of FIG. 4. The construction of the present invention is such, as will be described, so that the end of the probe on which the electrodes are mounted may be easily and smoothly turned so as to establish the desired orientations within the blood vessel. Or the magnetic field can be rotated so as to achieve the same orientation relative to the electrodes.

The system of FIG. 3 shows the manner in which the external coil 16 may be energized from an appropriate alternating current source 50. The coil leads $W_1$ and $W_2$ are connected to the source 50, so that an alternating magnetic field may be produced within the blood vessel, such as the aorta of the patient. The leads $L_1$ and $L_2$ from the pick-up electrodes $E_1$ and $E_2$ supply the resulting alternating current signals to an appropriate detector and amplifier 52, and the amplified output signal from the amplifier 52 is applied, for example, to a recorder 54 so that a record may be made.

The alternating current source 50, as well as the detector and amplifier 52 and recorder 54, are well known electrical units and are available commercially. Therefore, it is believed unnecessary to illustrate or discuss such units in detail herein. It might be pointed out that the detector 52, as is well known to the art, is a phase sensitive detector, and does not respond to quadrature phase signals which are produced by eddy currents, and which are not a function of the blood flow. It will be appreciated that the orientation concepts described herein are equally applicable to the loop probes described in the aforesaid copending application Ser. No. 873,240.

In the operation of the apparatus of the invention, the resilient probe formed by the leads $L_1$ and $L_2$ is initially straightened and inserted into the catheter C with a linear configuration. The catheter is then inserted into the blood vessel 10, for example, by usual prior art percutaneous methods, as described above. During the insertion process, a plug 17, which is slidable on the leads $L_1$ and $L_2$, is inserted into the external end of the tubular catheter C, so as to prevent bleeding through the tubular catheter C. The plug 17 may also have the form of a conical perforated member which is slidably mounted on the leads $L_1$, $L_2$, so that it may be moved along the stem of the probe. The plug 17 serves to close the end of the catheter C as the probe is introduced into the catheter, and the probe is then pushed through the plug into the catheter C until its inner angulated end emerges in the blood vessel from the end of the catheter, such as shown in FIGS. 1 and 1a. In this way, no significant amount of blood can escape through the tubular catheter C as it is being inserted and after it has been inserted into the artery or vein. The plug may, for example, be formed by winding a Teflon tape around the probe in a conical configuration, or it can be made of two halves of a Teflon member with a groove in each half to accommodate a probe. Clearly, the plug 17 may be formed in any other appropriate manner, and of any appropriate material suitable to perform its intended purpose.

As explained above, when the probe $L_1$, $L_2$ has been inserted into the blood vessel, such as shown in FIGS. 1 and 1a, it must first be oriented to a position such that the plane of its electrodes $E_1$ and $E_2$ lies parallel to the lines of force from the external magnetic field, in order that the zero base line may be established. However, in trying to rotate the probe inside a bent artery or inside a bent catheter tube, such as the tube C, for that purpose, it was found that the probe does not rotate smoothly at its angulated or looped end. Instead, and as mentioned above, the angulated end portion of the probe turns suddenly to a new equilibrium position as the probe is turned about its longitudinal axis, without stopping at intermediate angles. This action prevents the shaped end of the probe from being set easily to desired different angular positions for the aforesaid purpose, insofar as the flow meters described in the copending applications are concerned.

To remedy the unwanted snap-action of the shaped end, the assembly of the present invention provides a simple means for mechanically coupling the probe to the tubular catheter C, and this means comprises in the illustrated embodiments of FIGS. 1 and 1a, the formation of a V-shaped slot or notch 19 at the inner end of the hollow catheter C. Then, in order to insert the probe into the blood vessel, the probe is straightened and inserted through the tubular catheter C, as described above, until its angulated end protrudes from the inner end of the catheter C and assumes its angulated shape, shown in FIGS. 1 and 1a. The probe is then drawn back into the hollow tubular catheter C, with a gentle withdrawing action until it falls into the slot 19, as shown in FIGS. 1 and 1a, and is thereby effectively coupled to the catheter C. As shown in FIG. 1a, it is advisable to cut the inside end of the catheter C at a slant and to locate the V-groove opposite the tip of the cut end to facilitate slipping of the probe bend into the V-groove when the stem is pulled. It is preferable to locate the electrode $E_1$ directly adjacent the bend in the probe, so that the electrode $E_1$ will be directly adjacent the end of the tubular catheter C, and will have a section lying outside the catheter in the blood stream as the probe is entrapped within the slot 19. Two such grooves diametrically opposite one another may be used in the loop type probe described in the copending application Ser. No. 873,240.

Then, in order to turn the angulated end of the probe to any desired angular position, the catheter C and the probe are turned together, for example, by means of a handle H shown in FIG. 3, although such a handle is not essential since the catheter C itself may be grasped and twisted to perform the desired orientation operations. This turning of the probe and the hollow catheter together provides a smooth turning action within the blood vessel, insofar as the angulated end portion of the probe is concerned, and a simple solution to a very difficult problem. The resulting assembly is easily capable of being set to any desired angular position of the inner end portion of the probe within the blood vessel. The looped end 18 of the probe, as mentioned above, prevents scratching or otherwise injuring the inner wall of the blood vessel while the aforesaid manipulation is being carried out. Preferably the probe may be withdrawn partly into the catheter tube during rotation so that the probe end does not scrape the artery.

Therefore, by the provision of the V-groove 19 in the end of the catheter C, and by causing the bent end portion of the probe to engage the V-groove, as the outer catheter C is rotated, the bent end of the catheter probe rotates with it, and it may be stopped at any desired angle.

In the modified construction of FIGS. 6 and 7, a metallic hypodermic tube 100 is used in place of the wire $L_1$ of the prior embodiment. The tube 100 has an outer insulation layer. In the embodiment of FIG. 6, the insulation is scraped from the end of the tube 100 to form the electrode $E_1$. The resulting bare surface is preferably gold plated and then platinized. Alternately, a thin platinum or silver wire may be soldered to the tube and wound around it and then platinized to form the electrode $E_1$, or a thin platinum wire soldered to the tip of tube 100 is wound on the insulated wire $L_2$ to form electrode $E_1$ as shown in FIG. 7.

In both the embodiments of FIGS. 6 and 7, the wire $L_2$ is inserted into the tube 100 and liquid epoxy 101 is introduced into the tube. After the probe is in position, the epoxy 101 is allowed to harden to bond the probe to the tube. As shown in FIG. 8, the portion of the probe between the electrodes $E_1$ and $E_2$ may be thickened with a non-conductive tube or layer 102.

Therefore, in the embodiment of the invention described above, the zero base line is established by keeping the direction of the magnetic field constant, and by then rotating the probe about the long axis of its stem so that the orientation of the plane of the bend of the probe varies relative to the direction of the magnetic field. In a second embodiment, the probe may be left within the blood vessel in orientation in which it comes to rest after its introduction, and the orientation of the magnetic field with respect to the probe may be altered so as to achieve the same results.

The foregoing may be achieved in more than one way. For example, one way of achieving the result would be to mount the coil generating the magnetic field, such as the coil 16 of FIG. 2, in such a fashion that it could be revolved around an axis which is approximately coaxial with the stem of the probe, or with the axis of the blood vessel. Alternately, the patient in FIG. 3 may be turned about such an axis while holding the coil 16 stationary. In either case, the direction of the magnetic field contributed by the straight portions of coil 16 at the center of the rectangle defined by these straight portions is perpendicular to the plane in which said straight portions lie and the magnetic field will be perpendicular to the axis of rotation if the latter lies in the plane defined by the straight portions of coil 16. The objective of rotating either the patient or the coil 16 is to change the angle between the magnetic field of coil 16 and the plane of the bend of the probe which can be 180° for a half revolution of the coil or the patient. When the coil is oriented so that the plane defined by the straight portions of the coil 16 is parallel to the plane of the bend of the probe, a maximum flow signal is obtained. However, when these two planes are mutually perpendicular so that the magnetic field is parallel to the plane of the bend of the probe, the flow signal is precisely zero.

As in the previous embodiment, the orientation in which the magnetic field is parallel to the plane of the bend of the probe, and in which the flow signal is zero, is utilized for adjustment of the phase sensitive detector to obtain a zero signal. In other words, the phase of the phase sensitive detector is adjusted for zero signal, and so the recorder does not alter its reading when the magnetic field is turned on or off. Now, having adjusted the phase sensitive detector for the zero signal reading, the magnetic field is turned through 90° by turning the coil 16 into an orientation in which the optimum flow signal is obtained. The system is now adjusted so that the flow signal which is being recorded is being recorded relative to the correct base line, namely, the line which gives a zero reading for the zero flow. And the same base-line is obtained when the flow is stopped as is provided when the magnetic field is turned off without stopping the flow.

Instead of mounting the coil 16 of FIG. 2 on an appropriate bracket for rotation, as described above, the coil may merely be placed in a first position for zero reading adjustment, and a second position perpendicular to the first position for normal flow signal recording. Practically this can be done as follows: The normal position for the coil 16, for example, could by lying flat under the subject which is located on a slightly elevated board. This is the position for optimum blood flow recording. Now, the position for zero signal would simply by one in which the coil is pulled out from under the subject and placed on the side of the subject the coil standing on its edge. In the latter case, a zero flow signal is derived, and it is in the latter position in which the phase sensitive recorder is adjusted to give the zero signal.

A third way of accomplishing the desired result would be to have two coils, designated 16A and 16B in FIG. 9 and positioned at right angles to one another. The coil 16A, for example, may be positioned under the subject, and the coil 16B on the side of the subject. The coils may be oriented in such a fashion that the magnetic fields generated by the two coils are perpendicular to each other. The two coils may now be used as follows: First, excite, for example, the vertical coil 16A and orient its magnetic field with respect to the probe by shifting the probe or the coil slightly so that a zero flow signal is obtained, the zero flow signal being recognized as in the previous embodiments by the disappearance of signal pulsations due to the arterial blood flow. The phase sensitive detector is now adjusted so that the recorder reads zero. Having achieved this, the vertical coil 16A, which is on the side of the subject is de-energized, and the horizontal coil 16B which is under the subject is energized. The magnetic field of the coil 16B is perpendicular to the field of the coil 16A, and the flow signal is now optimally sensed. That is, there is now optimum orientation of the magnetic field relative to the probe, and the base line is calibrated to be zero for zero flow.

A resultant magnetic field of any desired orientation with respect to the probe may be achieved by exciting both coils 16A and 16B simultaneously in series or in parallel. Then, the magnetic field is the resultant field which is obtained by vectorial addition of the two individual field components $B_A$ and $B_B$ shown in FIG. 9. For example, if there two fields are of equal magnitude, then the magnetic field, the resultant field, is going to be inclined at 45° with respect to either of these two fields. If the intensity of, for example, the horizontal magnetic field is now diminished, the horizontal component of the resultant field becomes smaller and smaller and finally when the horizontal component becomes zero, a purely vertical magnetic field then exists. Conversely, if the horizontal component is held constant and the component of the vertical field is diminished, then the magnetic field which started out as a 45° field relative to the horizontal becomes closer and closer to the horizontal, and when the vertical component disappears a purely horizontal magnetic field results.

It is thus possible, and this is a very convenient feature of this implementation, to rotate the direction of the magnetic field without physically rotating any apparatus and in this fashion the orientation of the magnetic field relative to the plane of the bend of the probe can be controlled so as to make the adjustment as previously described. This simply means that the intensity of at least one of the two magnetic fields is changed until the pulsating signal due to flow disappears. The phase sensitive detector is then adjusted to provide a zero reading, and then the direction of the resultant magnetic field is rotated by 90° simply by exchanging the value of the current in the two coils. In the latter operation of exchanging the currents of the two coils it is important to make sure that the relative phase with the two currents with respect to each other remains preserved. That is, if, for example, the currents in the two coils are in a phase aiding relationship when superimposed, they must remain in a phase aiding relationship after the switching operation.

As shown in FIG. 10, if desired, the patient may be supported on a rotatable table 120 over the coil 16, and the coil may be flat on a further stationary support surface, such as a table top. Now the desired results of the invention may be achieved by turning the table 120 and the patient until the desired relative orientations, as discussed above, are realized.

Insofar as the probes of FIGS. 6 and 7 are concerned, for example, an additional line such as a "fishing line" 109 may extend through the tube 100 to the end of the protruding wire $L_2$. This latter line may be pulled back, after the catheter is in place so as to establish the probe at any desired angulation up to, for example, 90°.

It should be pointed out that although particular embodiments illustrating the concepts of the invention have been illustrated herein, modifications embodying the invention may be made. It is intended in the following claims to cover all such modifications which fall within the spirit and scope of the invention.

What is claimed is:

1. A method of measuring fluid flow by an electromagnetic catheter type flow meter which comprises an elongated probe member, said method comprising:
   inserting said probe member into a fluid-carrying conduit;
   creating a magnetic field within said conduit;
   first positioning the relative angular orientation of said probe member and said magnetic field to a minimal flow sensing position with respect to fluid flow in said conduit so as to obtain a reference base level; and
   subsequently positioning the relative angular orientation of said probe member and said magnetic field to an appreciable flow-sensing position with respect to such fluid flow.

2. The method defined in claim 1, in which said first and subsequent positioning steps comprise orienting said probe to first and second angular positions with respect to said magnetic field.

3. The method defined in claim 2, in which said probe is inserted into said conduit in an outer tubular catheter member, and in which said probe and catheter are turned together to establish said probe in said first and second angular positions.

4. The method defined in claim 3, in which said conduit comprises a blood vessel in a patient and in which said first and subsequent positioning steps comprise rotating the patient and said tubular catheter and probe inside said catheter.

5. The method defined in claim 1, in which said first and subsequent positioning steps comprise orienting said magnetic field with respect to said probe.

6. The method defined in claim 1, in which said first and subsequent positioning steps comprise orienting said conduit and probe together with respect to said magnetic field.

7. Probe means for use in flow meter comprising:
a catheter insertable into a blood vessel,
an elongate resilient probe having at least one bend near the distal end thereof and slideably inserted through said catheter and adapted to extend beyond the distal end of said catheter to a position in which the bend emerges from the distal end of the catheter and resides in the blood vessel,
said bend being resilient so that said probe may be straightened sufficiently for insertion through the catheter and may resume its bent configuration upon emerging from said catheter,
sensing means on said probe between said bend and said end of said probe, said probe including electrical conductive means connected to said sensing means, and
means for mechanically coupling said probe to said catheter adjacent said bend,
whereby said probe may be rotated by rotating said catheter about the catheter axis.

8. Probe means in accordance with claim 7 wherein said coupling means comprises:
a notch, formed in said end of said catheter, in which the bent end of said probe resides, to mechanically couple said probe and said catheter upon rotation of said catheter about the catheter axis.

9. Probe means in accordance with claim 8 wherein said catheter end is slanted with respect to the axis of said catheter, and
said notch is located at the portion of the slant remote from the distal end of the catheter,
thereby facilitating engagement of the said bent end of said probe with said notch.

10. Probe means in accordance with claim 7 wherein said electrical conductive means comprises said probe formed of a pair of generally parallel electric wires and
said sensing means comprises a pair of electrodes electrically connected to the respective ends of said wires and spaced from one another on said bent end of said probe.

11. Probe means in accordance with claim 7 wherein the distal end of said probe is in the form of a loop, thereby to minimize abrasion of the blood vessel as said probe means is rotated therewithin.

* * * * *